Aug. 9, 1960     C. M. GROGAN ET AL     2,948,452
SANITARY DRIP CATCHING DEVICE
Filed Dec. 30, 1957

INVENTORS
CECILE M. GROGAN
LESTER T. SAWYER by Charles R. Fay,

ATTORNEY

2,948,452
SANITARY DRIP CATCHING DEVICE

Cecile M. Grogan, Leominster, and Lester T. Sawyer, Sterling, Mass.; said Grogan assignor to said Sawyer Filed Dec. 30, 1957, Ser. No. 705,926

3 Claims. (Cl. 229—1.5)

This invention relates to a new and improved sanitary holder for ice-cream cones and similar confections, and the principal object of the invention resides in the provision of a molded plastic frusto-conical open-ended device fitting the cone and having a surrounding drip-catching tray or apron thereon adjacent the wider end thereof, together with means at the ends of the device adapted to lightly grip the cone to prevent accidental dislodgment of the cone from the device.

Further objects of the invention include the provision of a device of the class described molded of a plastic which has a degree of flexibility and resilience so as to conform to the shape of the ice-cream cone and to lightly grip the same at a point of relative thinness of the section of the device just above the annular drip-catching apron, so that drip running down the outside of the ice-cream cone is directed to flow into the drip-catching apron; and the provision of the device as aforesaid including a series of radial, inwardly-disposed, thin flexible fingers which are integral with the device and which also grip the cone in a releasable manner to prevent accidental dislodgment thereof.

Other objects and advantages of the invention will appear hereinafter.

Reference is to be had to the accompanying drawings, in which

In carrying out the present invention, it is preferred to mold the device from a synthetic plastic in the nature of poly-ethylene which provides a certain "give" and resilience, so that the cone may be lightly gripped, without crushing, to prevent accidental dislodgment of the ice-cream cone from the plastic holder. Also, the device may be molded as a unitary object and can be made very inexpensively so that it may be disposed of after use or, if desired, it may be cleaned for re-use.

Figure 1:
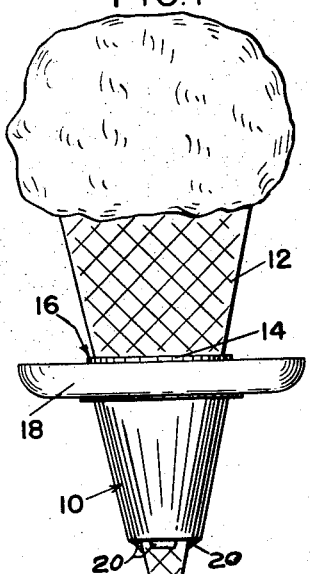
Fig. 1 is a view in elevation illustrating the invention in use.

The novel sanitary ice-cream cone holder comprises in general a frusto-conical main body portion 10 which is preferably open at both ends. The section of the wall of the device may be relatively thin to save material and to provide a construction which will in some degree conform to the shape of the ice-cream cone held therein as indicated at 12 in Fig. 1.

The wider end of the main body portion 10 is preferably provided with a tapering portion 14 which reduces to a very thin edge 16. This construction also provides for accommodation of the device to the cone held therein and at the same time provides a thin edge which is closely adjacent the surface of the cone, so that the drip will be directed down the outside surface of the device into the drip-catching tray or apron which is generally indicated at 18. The outer surface of the portion 14 is preferably substantially cylindrical as in Fig. 3, and the inside surface may be conical, conforming to the main body portion 10 or it may be located on a slight angle thereto to better grip the cone.

Figure 2:
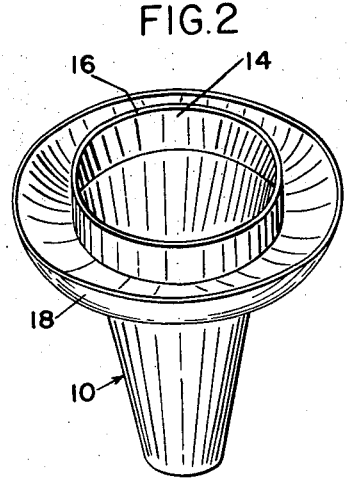
Fig. 2 is a perspective view of the device.
Figure 3:
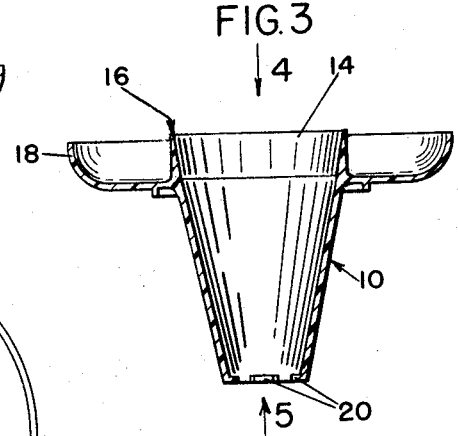
Fig. 3 is a longitudinal section thereof.
Figure 4:
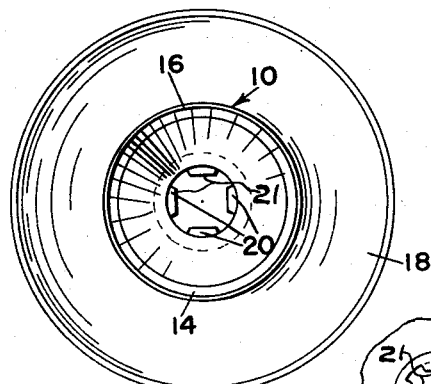
Fig. 4 is a top plan view, looking in the direction of arrow 4 in Fig. 3.
Figure 5:
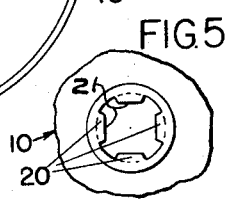
Fig. 5 is an end view of the novel device, looking in the direction of arrow 5 in Fig. 3.

The drip-catching tray or apron 18 extends circumferentially and radially outwardly from the body portion 10, as clearly shown in Figs. 2 to 4, and the shape of this tray or apron may be as desired. It is preferred that the same have a sufficient capacity to catch and retain as much drip as may be present under substantially all circumstances. To this end, the apron 18 includes a turned-up flange or rim, as clearly shown in the drawings, and the same is preferably integrally molded with the body 10 but of course it may be made separately and is easily secured thereto if desired.

At the smaller end of the novel device, there may be provided thin, flat, radial, inwardly-directed tabs or fingers 20 which are preferably substantially straight at their inward terminal edges 21. As the cone 12 is thrust into the holder, these tabs or fingers are deflected and the straight edges 21 distorted or bowed thereby, causing the same to resiliently grasp the cone. The tabs or fingers are thus pointed toward the small end of the cone and resist accidental dislodgment of the holder from the cone.

Figure 6:
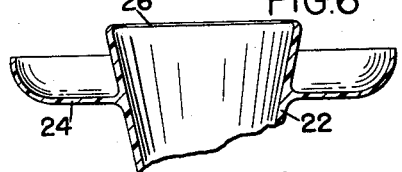
Fig. 6 is a section showing a modification.

In Fig. 6 there is shown a modified form of the device in which the conical portion thereof as at 22 is similar to that at 10 previously described, and there is also a drip-catching tray or apron 24 which may be similar to that at 18. However, at the larger end of the dripping device, there is an inwardly-directed, thin somewhat flexible resilient flange indicated at 26, and in this form of the invention, when the ice-cream cone is inserted in the holder, the thin flexible inwardly-directed flange 26 will tend to grip the ice-cream cone more positively so as to provide an extra degree of connection between the drip-catching device and the ice-cream cone.

It will be seen that this invention in either form provides a relatively simple and inexpensive device for holding confections in the nature of cones, and not only does it provide a sanitary and convenient handle for the cone, but it also catches the drip and provides against loss of the confection.

Having thus described our invention and the advantages thereof, we do not wish to be limited to the details herein disclosed, otherwise than as set forth in the claims, but what we claim is:

1. A drip protector for ice-cream cones and the like comprising a unitary hollow tapered member of a semi-resilient molded plastic material, said member having a size and shape to receive an ice-cream cone therein with the wider end of the latter extending well beyond the wider end of the tapered member, the latter having a thin section to provide for at least a slight degree of gripping action on the cone at the wider end of the tapered member preventing accidental dislodgment of the cone from the member and providing for the drip from the ice-cream to flow exteriorly of the tapered member, said tapered member being easily separable from the ice-cream cone, and a drip-catching tray adjacent the thin section at the wider end of the tapered member but spaced therefrom, said tray surrounding the latter, said tray comprising an outwardly extending peripheral flange secured to the tapered member and an upwardly extending rim secured to the outermost edge of said flange.

2. The drip protector of claim 1 wherein the wall of the tapered member has a portion near its wider end tapering in radial cross-section to a thin edge.

3. The drip protector of claim 1 including an inwardly-directed deformable resilient flange at the wider end of the hollow tapered member, said flange being displaced by the ice-cream cone and serving to detachably grip the same.

References Cited in the file of this patent

UNITED STATES PATENTS

| | | |
|---|---|---|
| 134,302 | Miller | Dec. 24, 1872 |
| 1,800,759 | Shean | Apr. 14, 1931 |
| 2,235,502 | Leppke | Mar. 18, 1941 |
| 2,321,519 | Rubinoff | June 8, 1943 |
| 2,589,967 | Sawyer | Mar. 18, 1952 |